INVENTORS
Donald T. Daniele and
Edgar C. Witt, Jr.
BY Karl W. Flocks
ATTORNEY

Jan. 19, 1965  D. T. DANIELE ETAL  3,166,468
PULP MOLDING MACHINE

Filed April 6, 1960  15 Sheets-Sheet 3

INVENTORS
Donald T. Daniele and
Edgar C. Witt, Jr.
BY  Karl W. Flocks
ATTORNEY

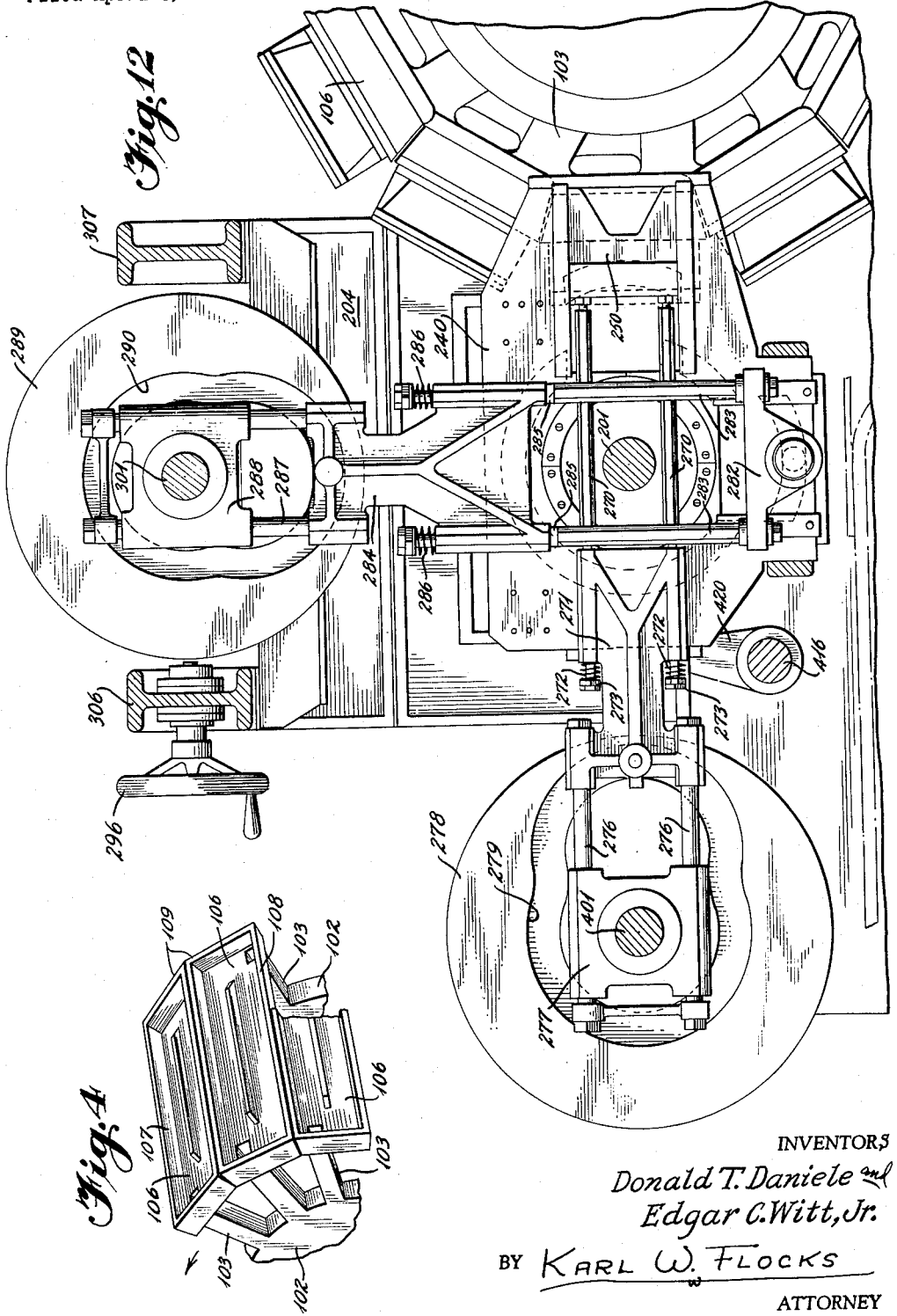

Jan. 19, 1965
D. T. DANIELE ETAL
3,166,468
PULP MOLDING MACHINE
Filed April 6, 1960
15 Sheets-Sheet 5
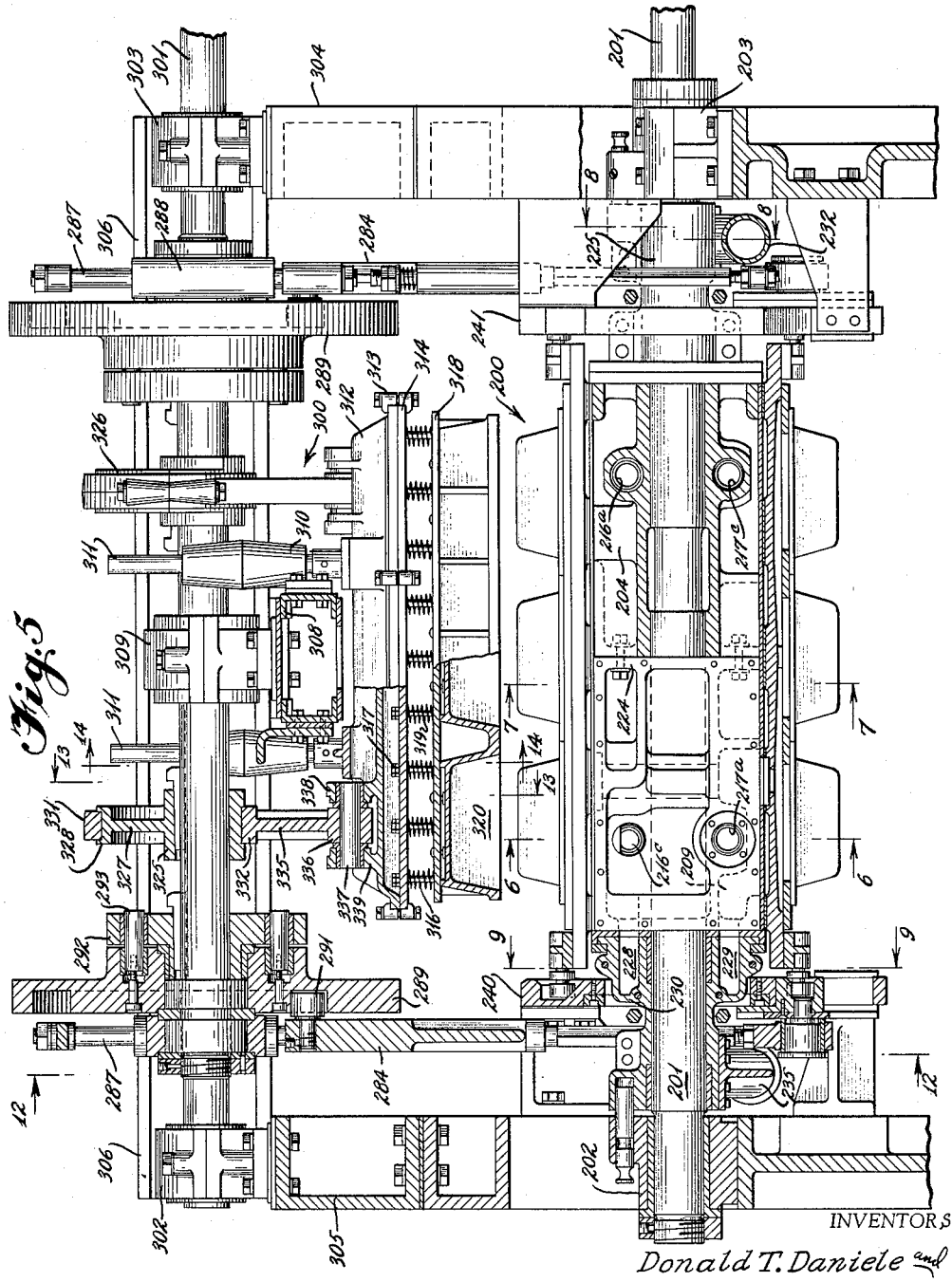
INVENTORS
Donald T. Daniele and
Edgar C. Witt, Jr.
BY Karl W. Flocks
ATTORNEY

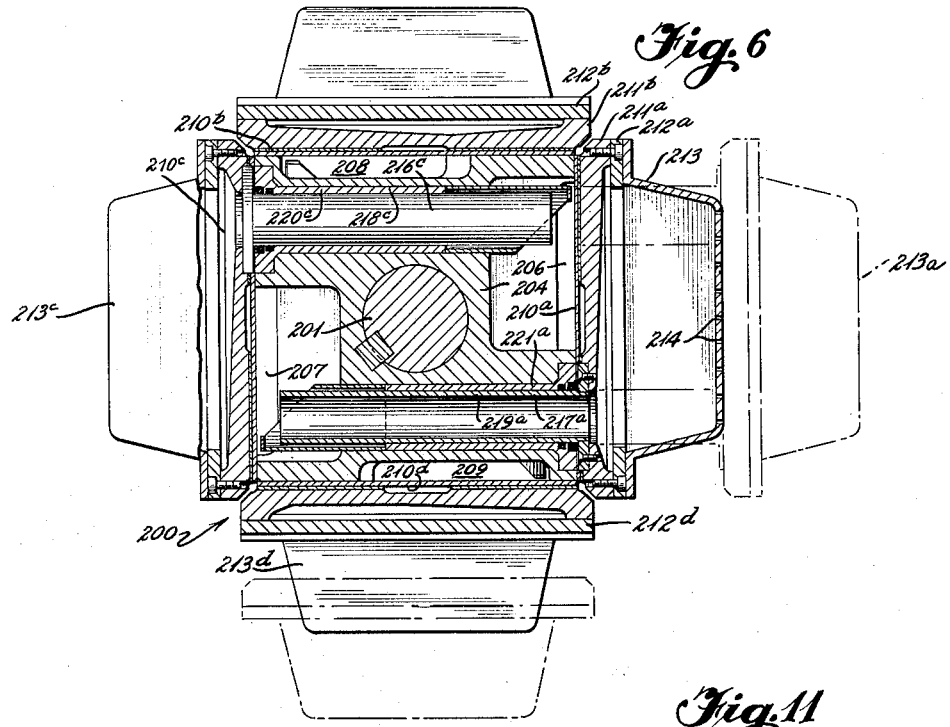
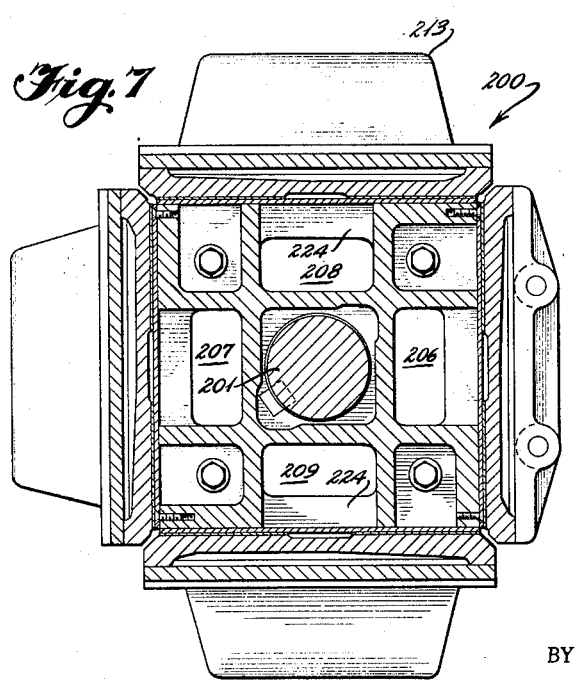
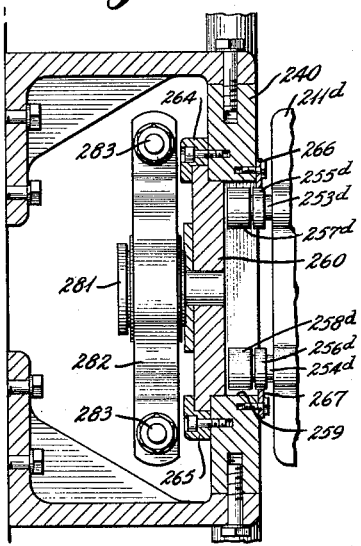

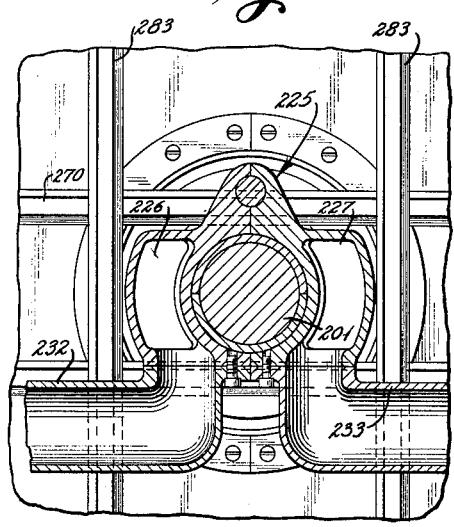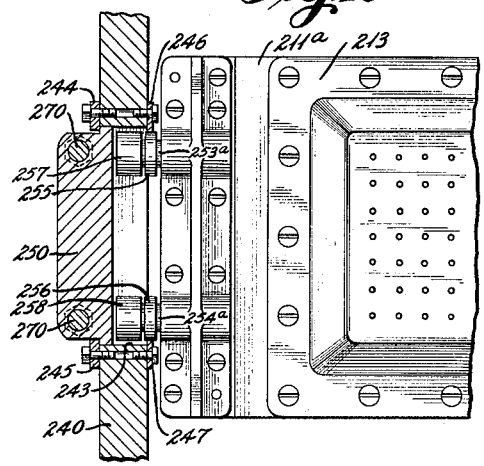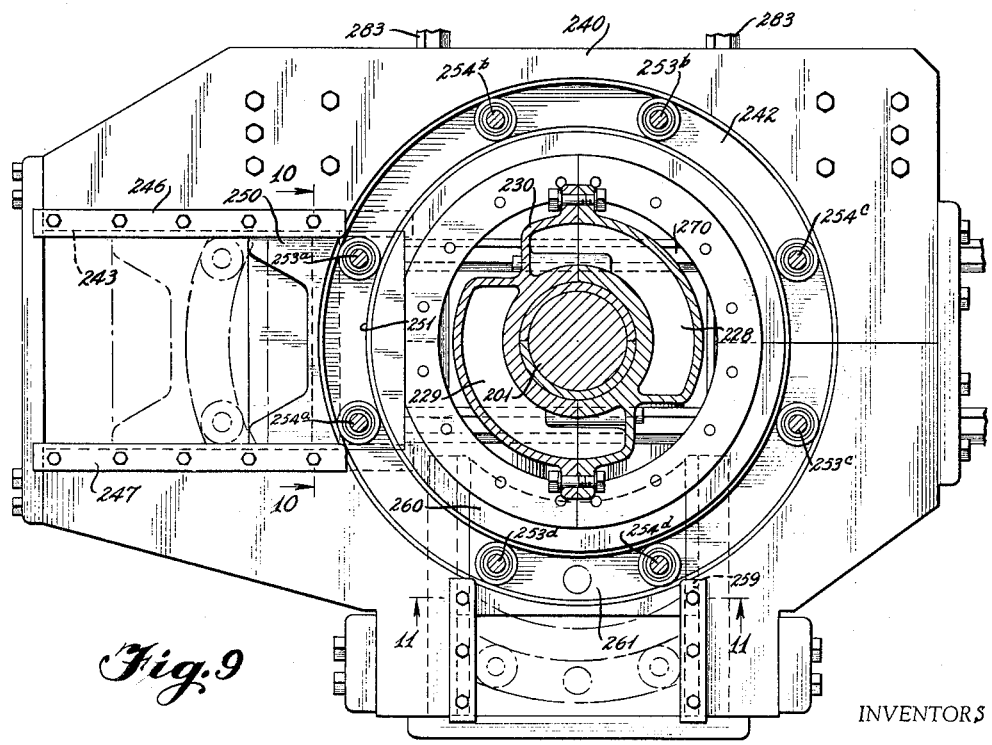

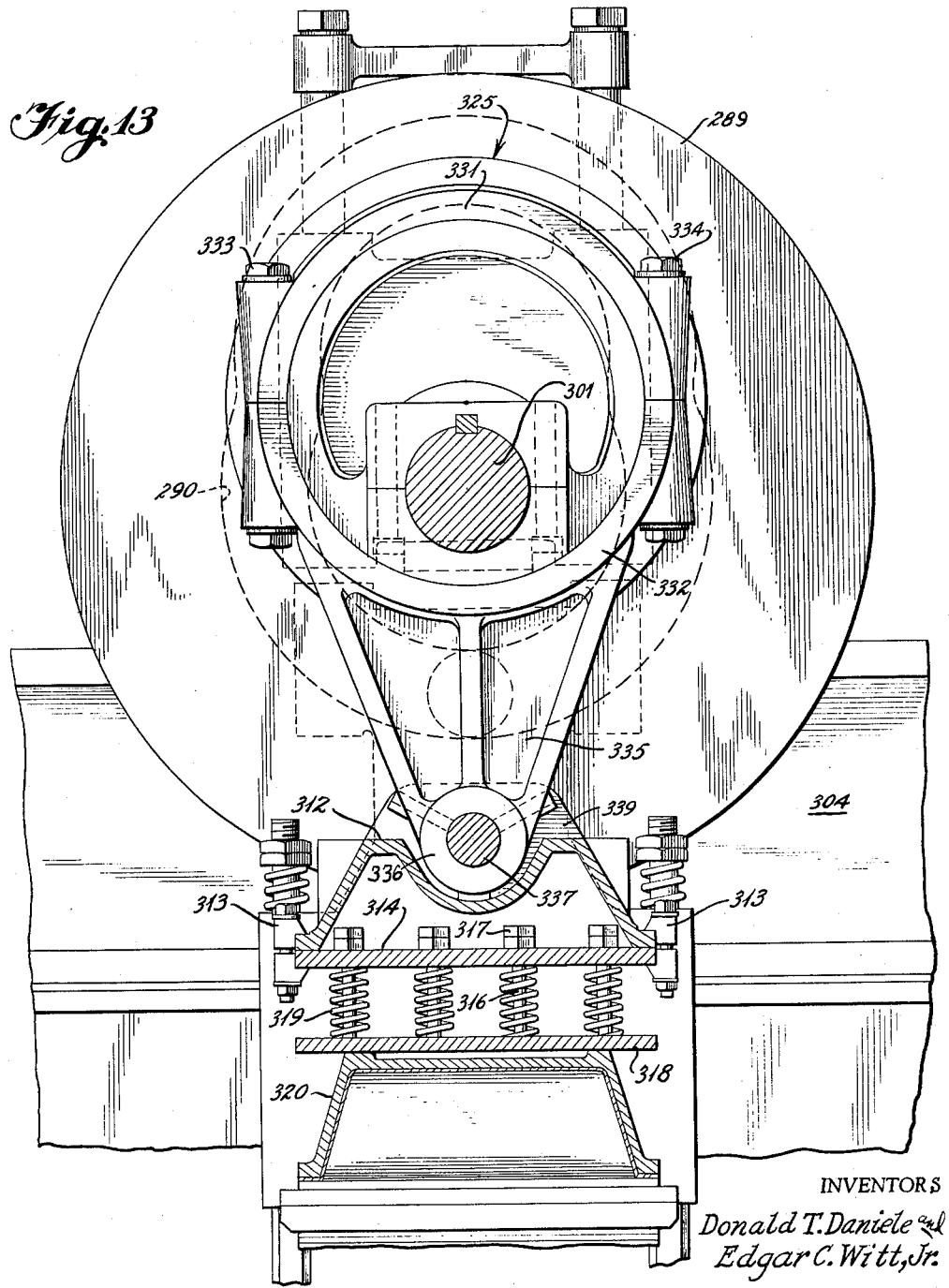

Jan. 19, 1965   D. T. DANIELE ETAL   3,166,468
PULP MOLDING MACHINE
Filed April 6, 1960   15 Sheets-Sheet 9
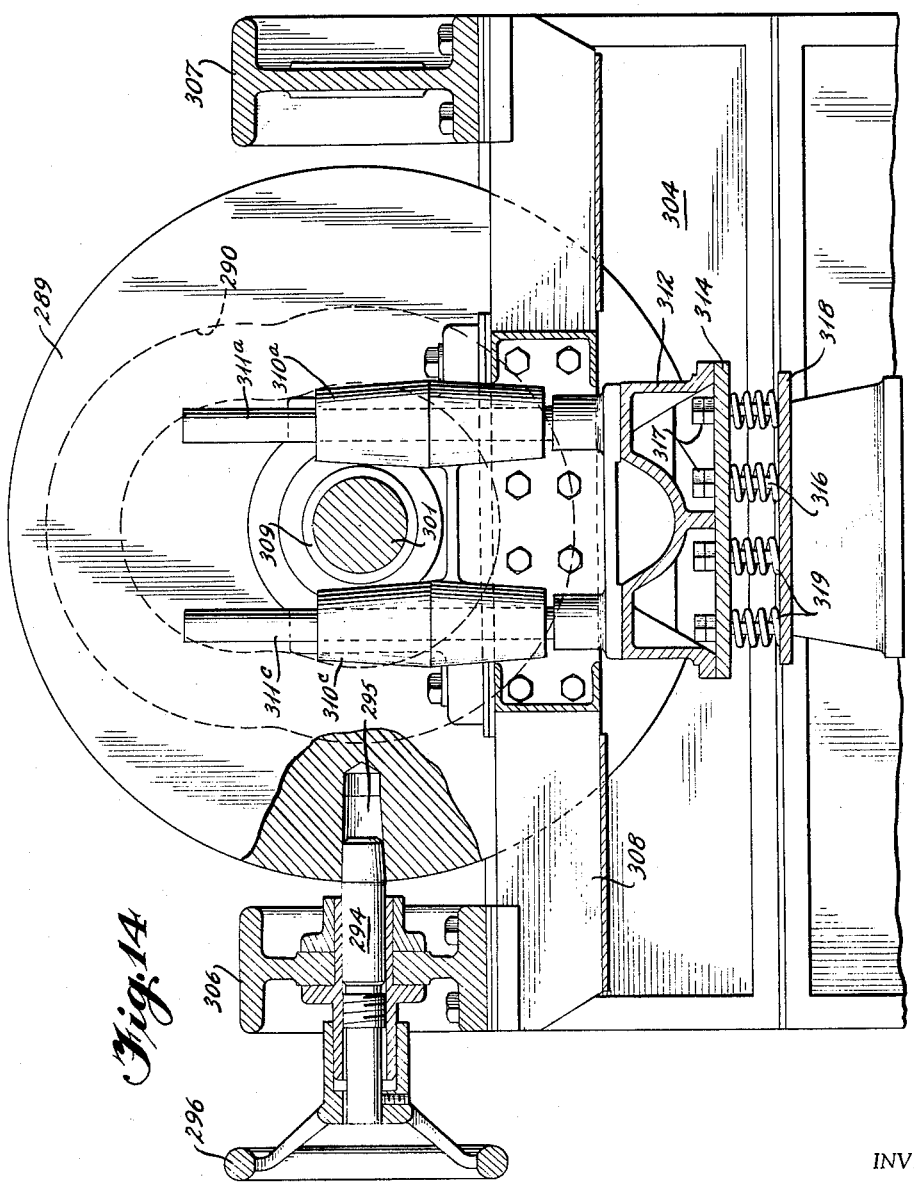
INVENTORS
Donald T. Daniele and
Edgar C. Witt, Jr.
BY Karl W. Flocks
ATTORNEY

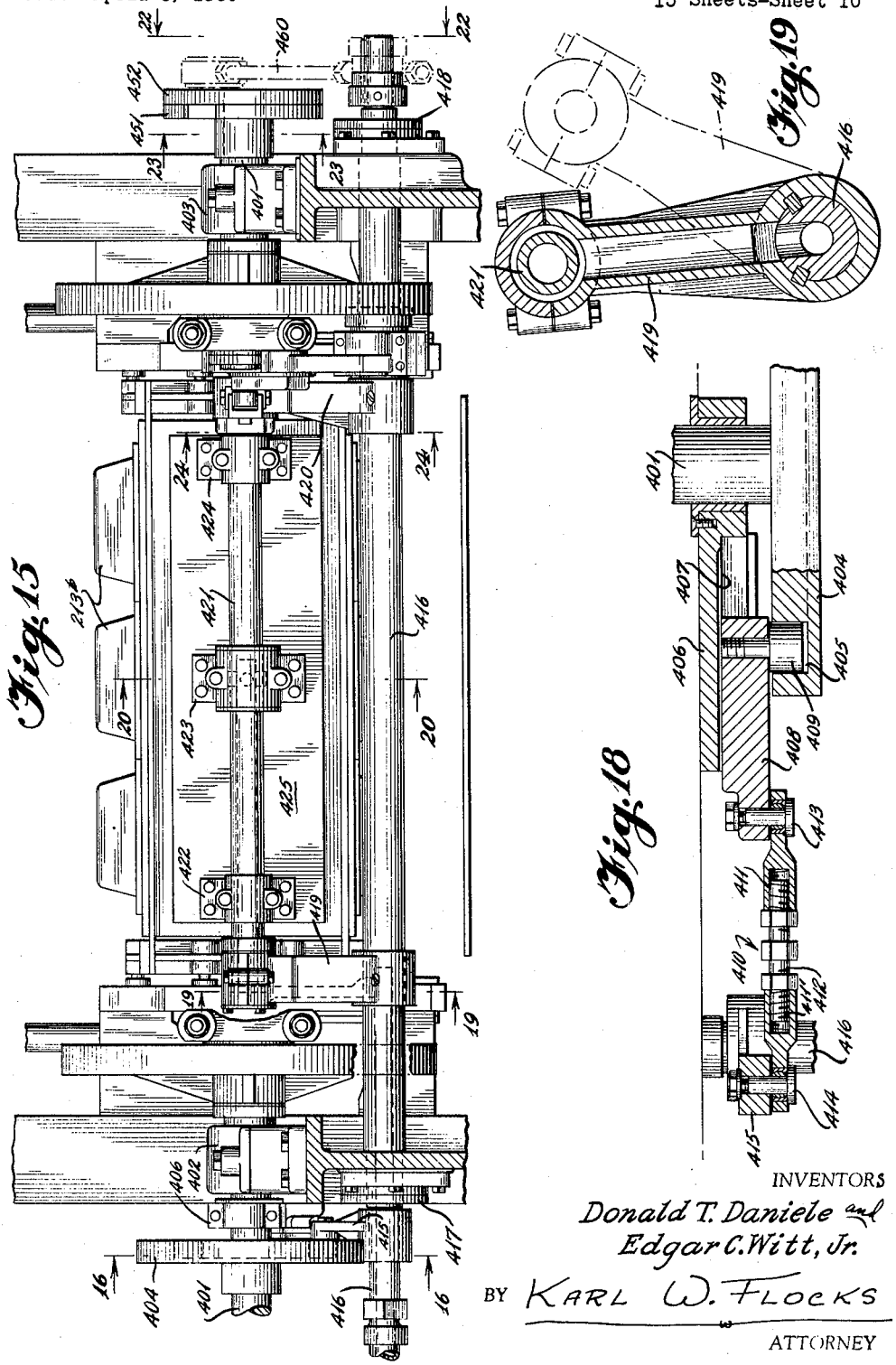

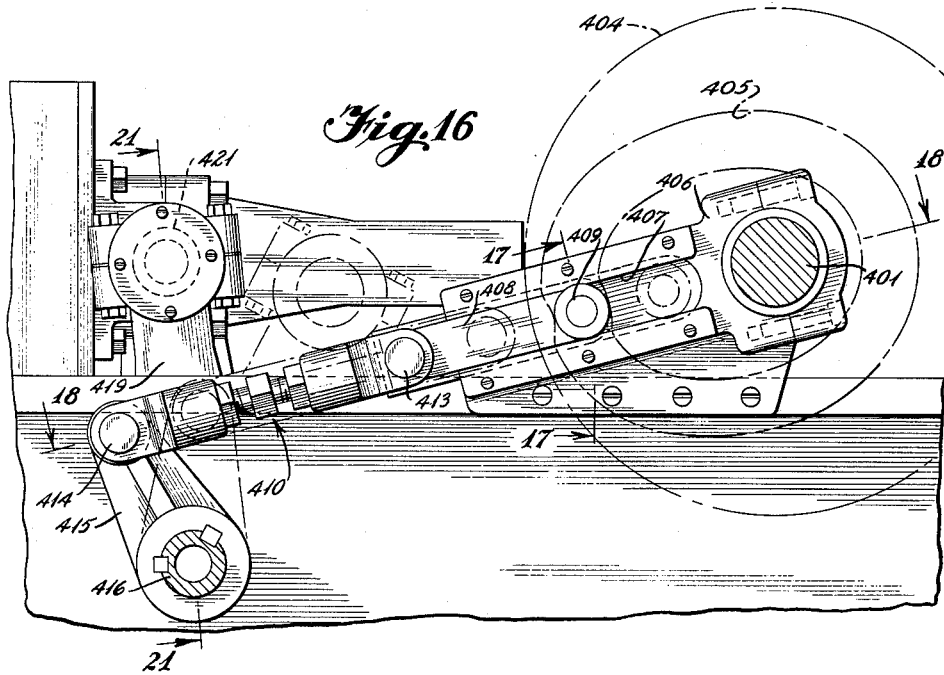
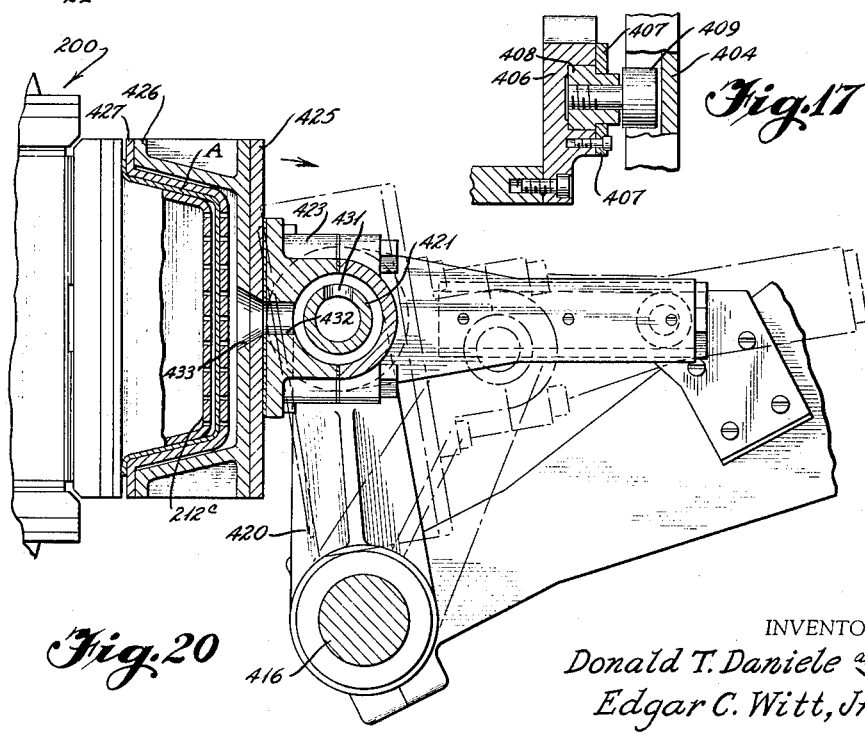

Jan. 19, 1965 D. T. DANIELE ETAL 3,166,468
PULP MOLDING MACHINE
Filed April 6, 1960 15 Sheets-Sheet 12
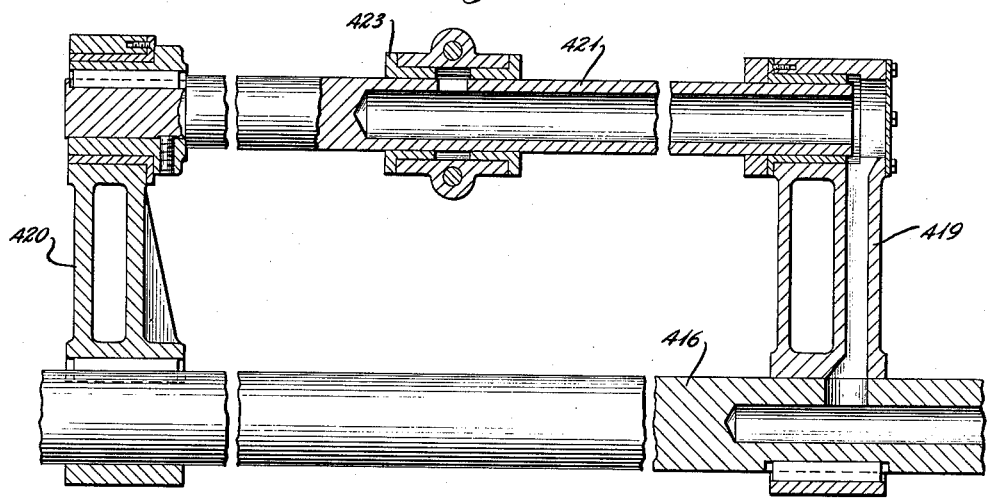
*Fig. 21*
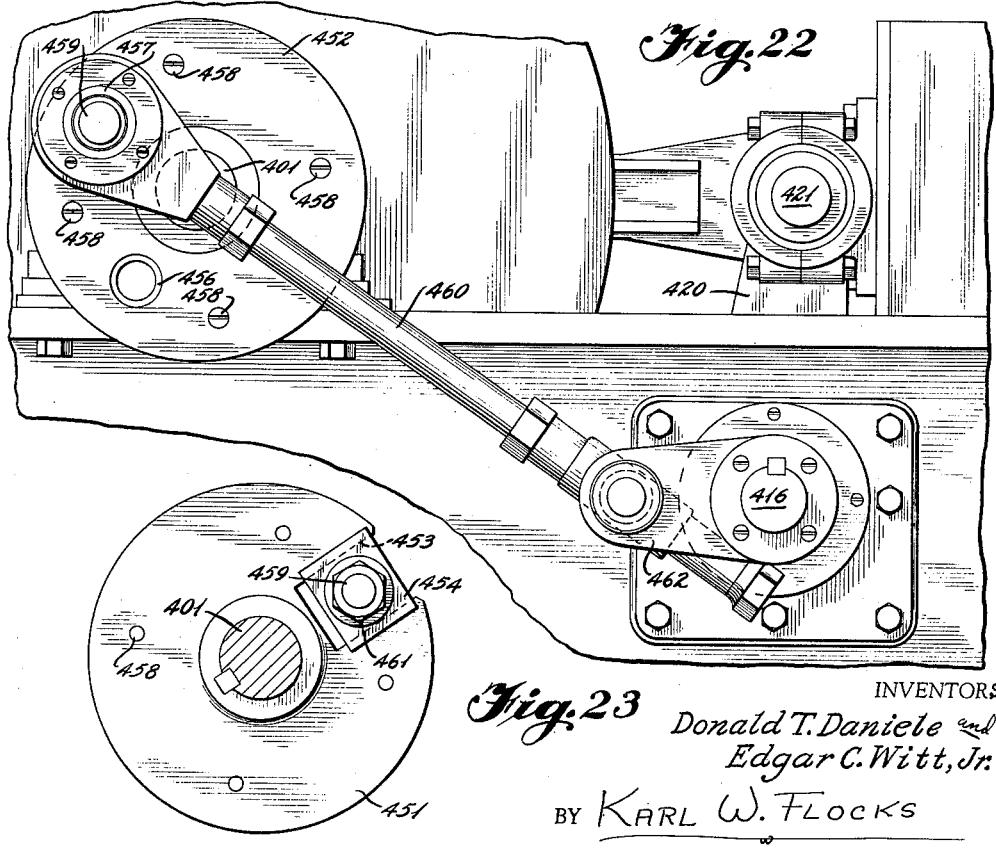
*Fig. 22*
*Fig. 23*
INVENTORS
Donald T. Daniele and
Edgar C. Witt, Jr.
BY Karl W. Flocks
ATTORNEY Jan. 19, 1965  D. T. DANIELE ETAL  3,166,468
PULP MOLDING MACHINE Filed April 6, 1960  15 Sheets-Sheet 13

INVENTORS
Donald T. Daniele and
Edgar C. Witt, Jr.

BY Karl W. Flocks

ATTORNEY

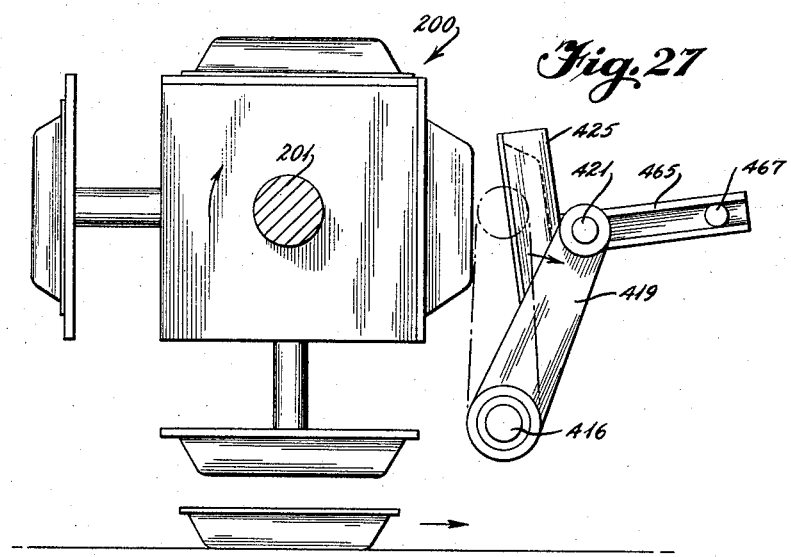
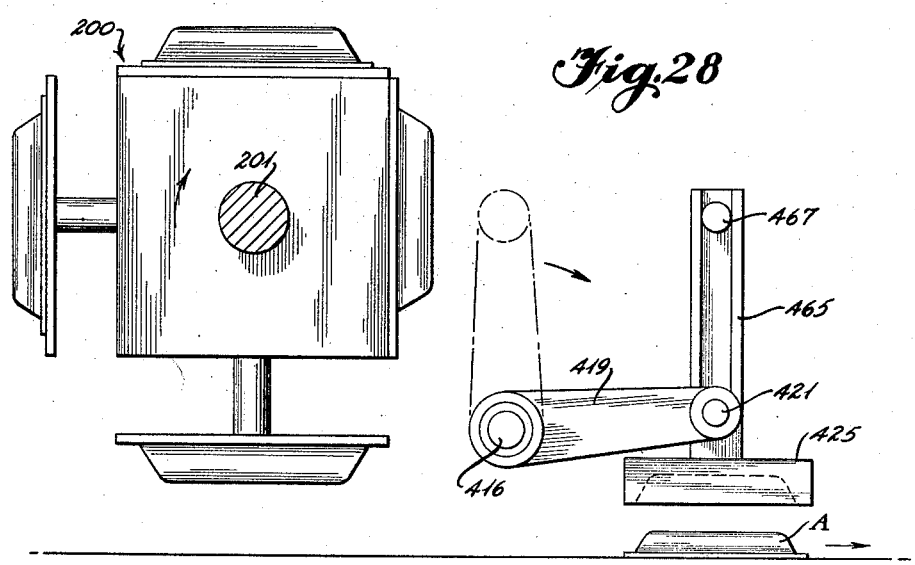

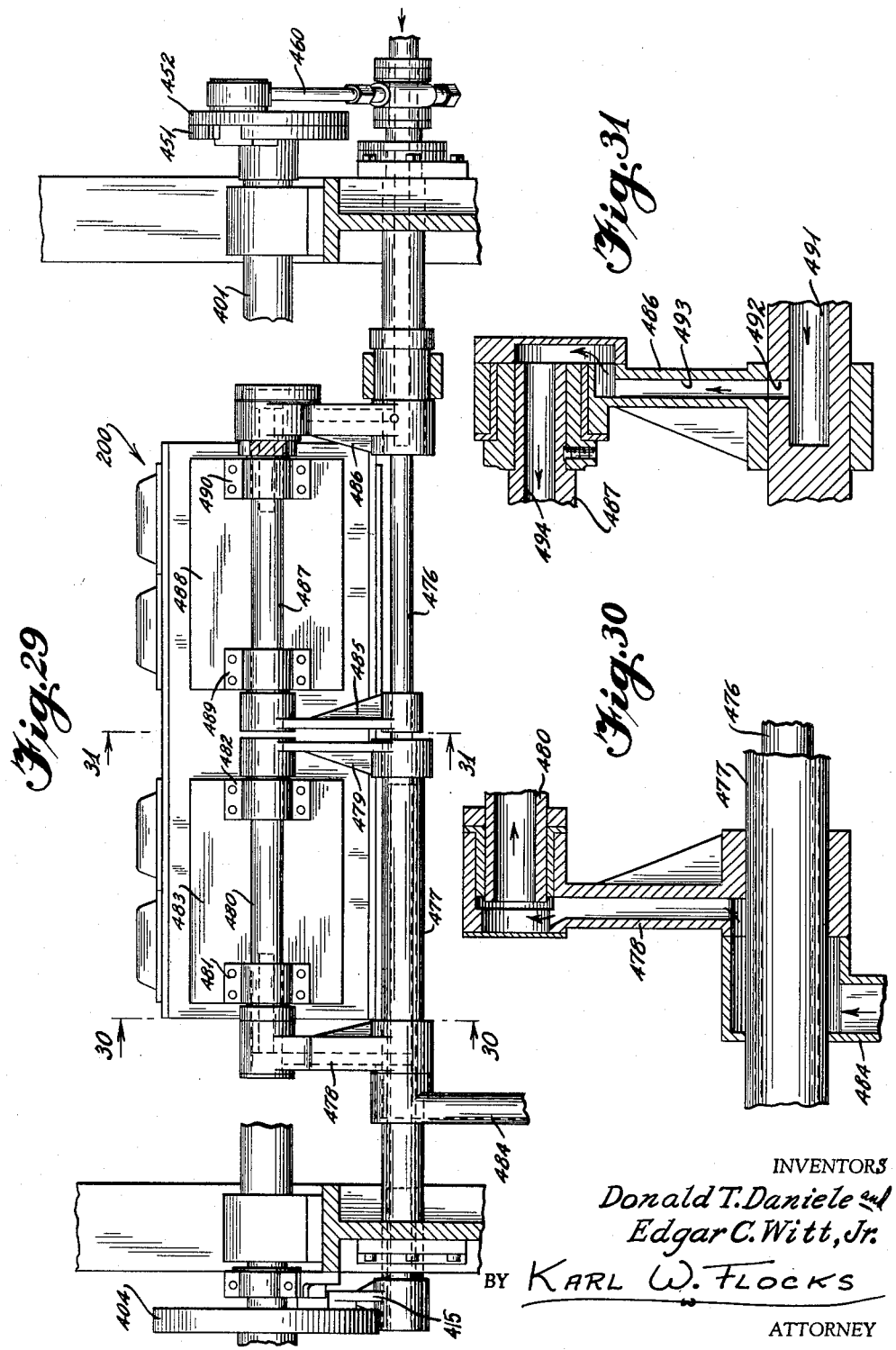

United States Patent Office 3,166,468
Patented Jan. 19, 1965

3,166,468
PULP MOLDING MACHINE
Donald T. Daniele, East Longmeadow, and Edgar C. Witt, Jr., Palmer, Mass., assignors to Diamond National Corporation, New York, N.Y., a corporation of Delaware
Filed Apr. 6, 1960, Ser. No. 20,340
24 Claims. (Cl. 162—392)

The present invention relates to a molding machine for molding articles from a pulp slurry, and more particularly to such a machine in which a turret is provided for receiving articles from a forming cylinder and in which articles may be pressed on the turret and delivered from the turret onto a conveyor in either a face-up or a face-down position.

Molding machines have heretofore been proposed for molding relatively inexpensive articles from a slurry of pulp fibers. While these machines have been in use for many years, from a standpoint of production, they have not always given the most satisfactory results. Hence, various ones of the known molding machines have heretofore had one or more drawbacks. Examples of such deficiencies are: Low molding face area, shallow depth of draw, pressing of the articles against the forming dies on the forming cylinder with consequent shortening of forming die screen life, distortion caused by non-uniform drying and consequent non-uniform shrinkage of the articles, defective wet-pressing of the article, etc. As a result of these deficiencies, the size of product range was limited, production costs were high, quality was lower than it should be for the finished product, and total volume of production was too low.

Among the objects of the present invention are to provide a molding machine which in general will produce articles of improved quality, will have a relatively large-size-of-product range and will be able to produce articles at a relatively lower production cost.

Other objects are to provide a molding machine which will produce articles with lessened distortion, which will be able to wet-press the articles in a superior manner than has heretofore been accomplished, which will have a longer forming die wire life, and will avoid the wetting of partially dried articles on the forming cylinder.

Other objects and the nature and advantages of the instant invention will be apparent from the following description taken in conjunction with the accompanying drawings, wherein:

FIGURE 4 is a partial perspective view of the forming cylinder of the molding machine shown in FIGURES 1 to 3.

FIGURE 5 is a cross-sectional view taken on the line 5—5 of FIGURE 1.

FIGURE 6 is a cross-sectional view taken on the line 6—6 of FIGURE 5.

FIGURE 7 is a cross-sectional view taken on the line 7—7 of FIGURE 5.

FIGURE 8 is a cross-sectional view taken on the line 8—8 of FIGURE 5.

FIGURE 9 is a cross-sectional view taken on the line 9—9 of FIGURE 5.

FIGURE 10 is a cross-sectional view taken on the line 10—10 of FIGURE 9.

FIGURE 11 is a cross-sectional view taken on the line 11—11 of FIGURE 9.

FIGURE 12 is a cross-sectional view taken on the line 12—12 of FIGURE 5.

FIGURE 13 is a cross-sectional view taken on the line 13—13 of FIGURE 5.

FIGURE 14 is a cross-sectional view taken on the line 14—14 of FIGURE 5.

FIGURE 15 is a cross-sectional view taken on the line 15—15 of FIGURE 1.

FIGURE 16 is a cross-sectional view taken on the line 16—16 of FIGURE 15.

FIGURE 17 is a cross-sectional view taken on the line 17—17 of FIGURE 16.

FIGURE 18 is a cross-sectional view taken on the line 18—18 of FIGURE 16.

FIGURE 19 is a cross-sectional view taken on the line 19—19 of FIGURE 15.

FIGURE 20 is a cross-sectional view taken on the line 20—20 of FIGURE 15.

FIGURE 21 is a cross-sectional view taken on the line 21—21 of FIGURE 16.

FIGURE 22 is an elevational view taken on the line 22—22 of FIGURE 15.

FIGURE 23 is a cross-sectional view taken on the line 23—23 of FIGURE 15.

FIGURE 27 is a schematic cross-sectional view showing one position of the parts of FIGURES 22 through 26.

FIGURE 28 is a similar view showing the parts in another position thereof.

FIGURE 29 is a view similar to FIGURE 15 of a machine in accordance with another embodiment of the present invention.

FIGURE 30 is a cross-sectional view taken on the line 30—30 of FIGURE 29.

FIGURE 31 is a cross-sectional view taken on the line 31—31 of FIGURE 29.

Figure 1:
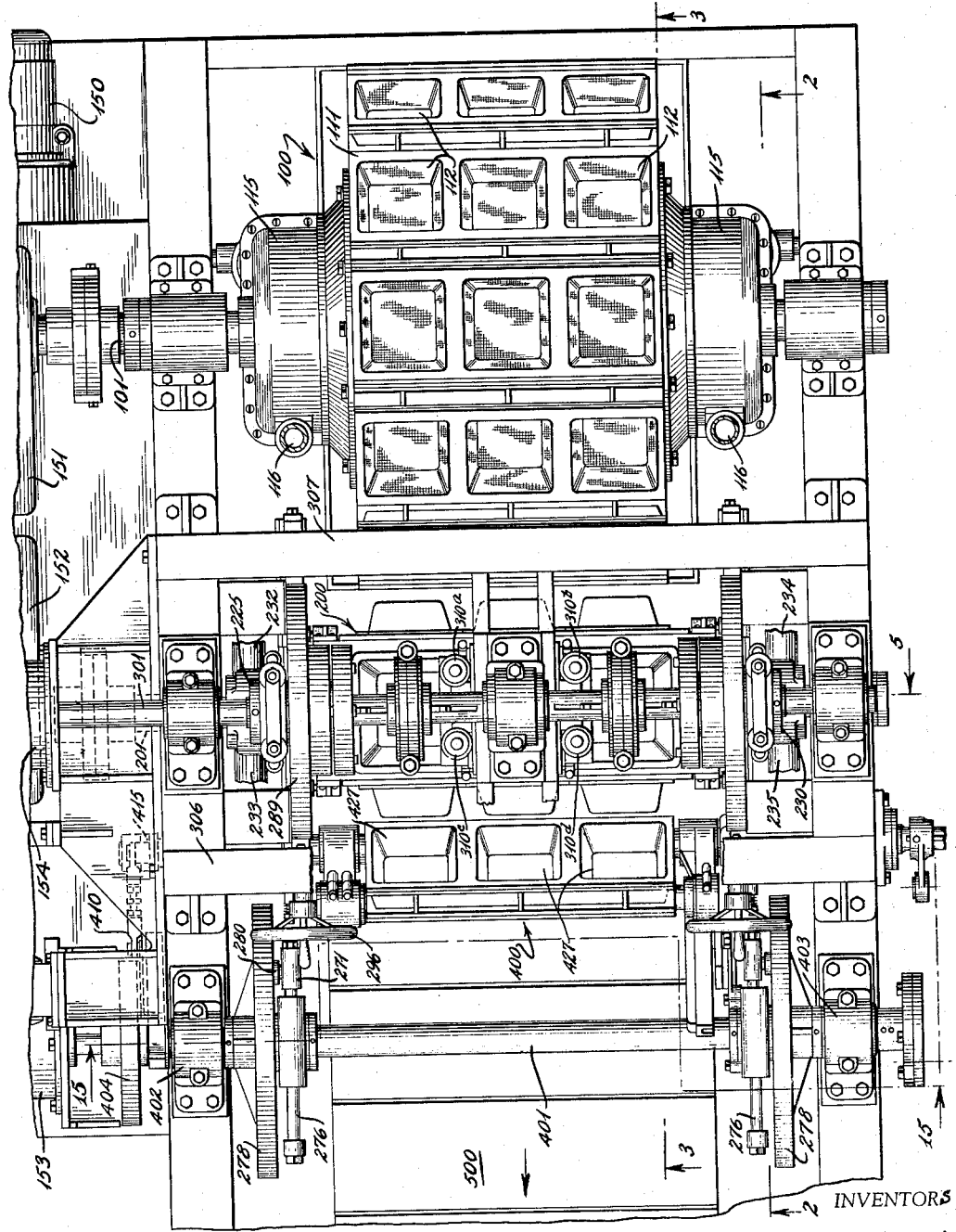
FIGURE 1 is a plan view of a molding machine in accordance with the present invention.
Figure 2:
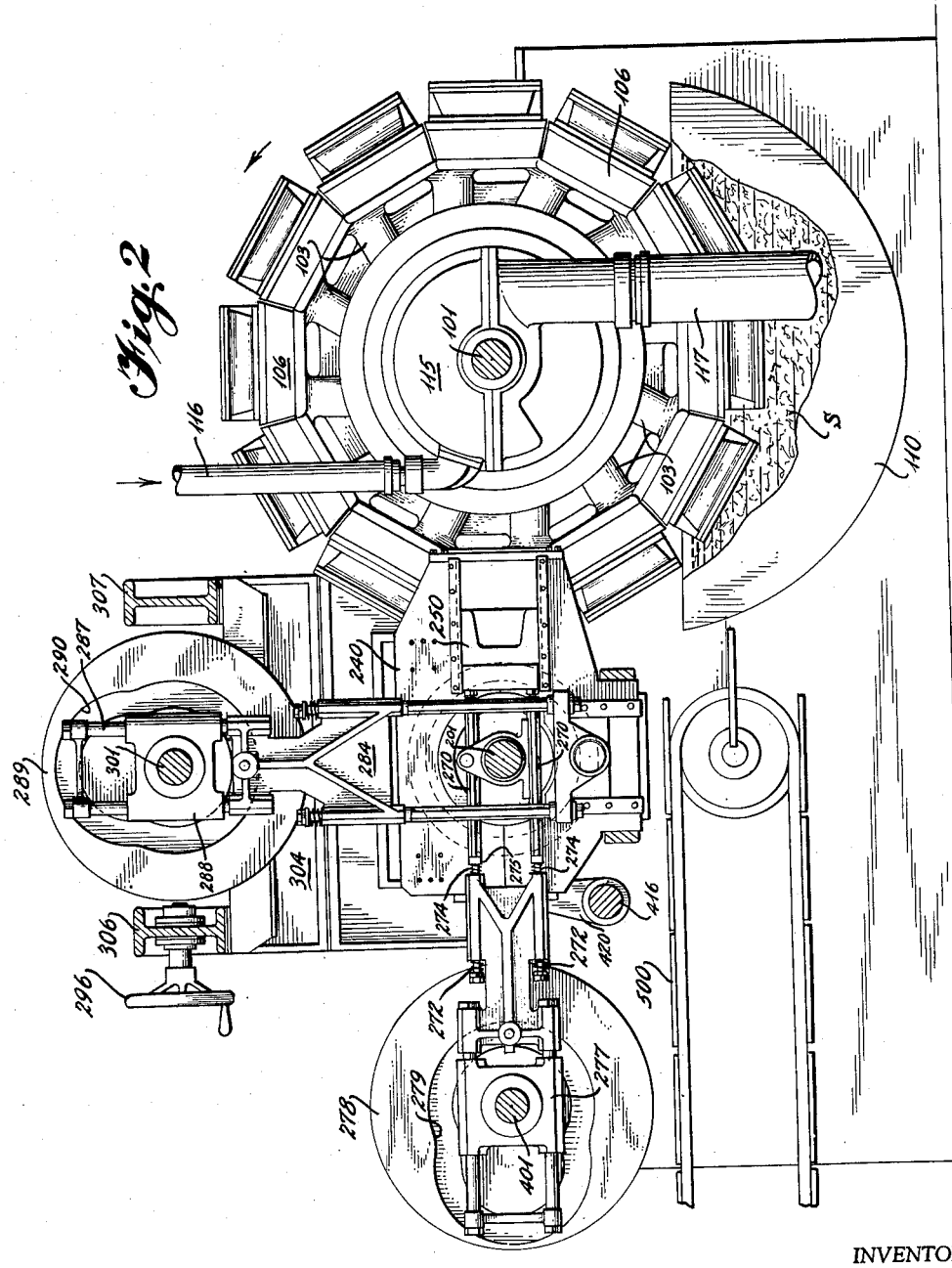
FIGURE 2 is a cross-sectional view taken on the line 2—2 of FIGURE 1.
Figure 3:
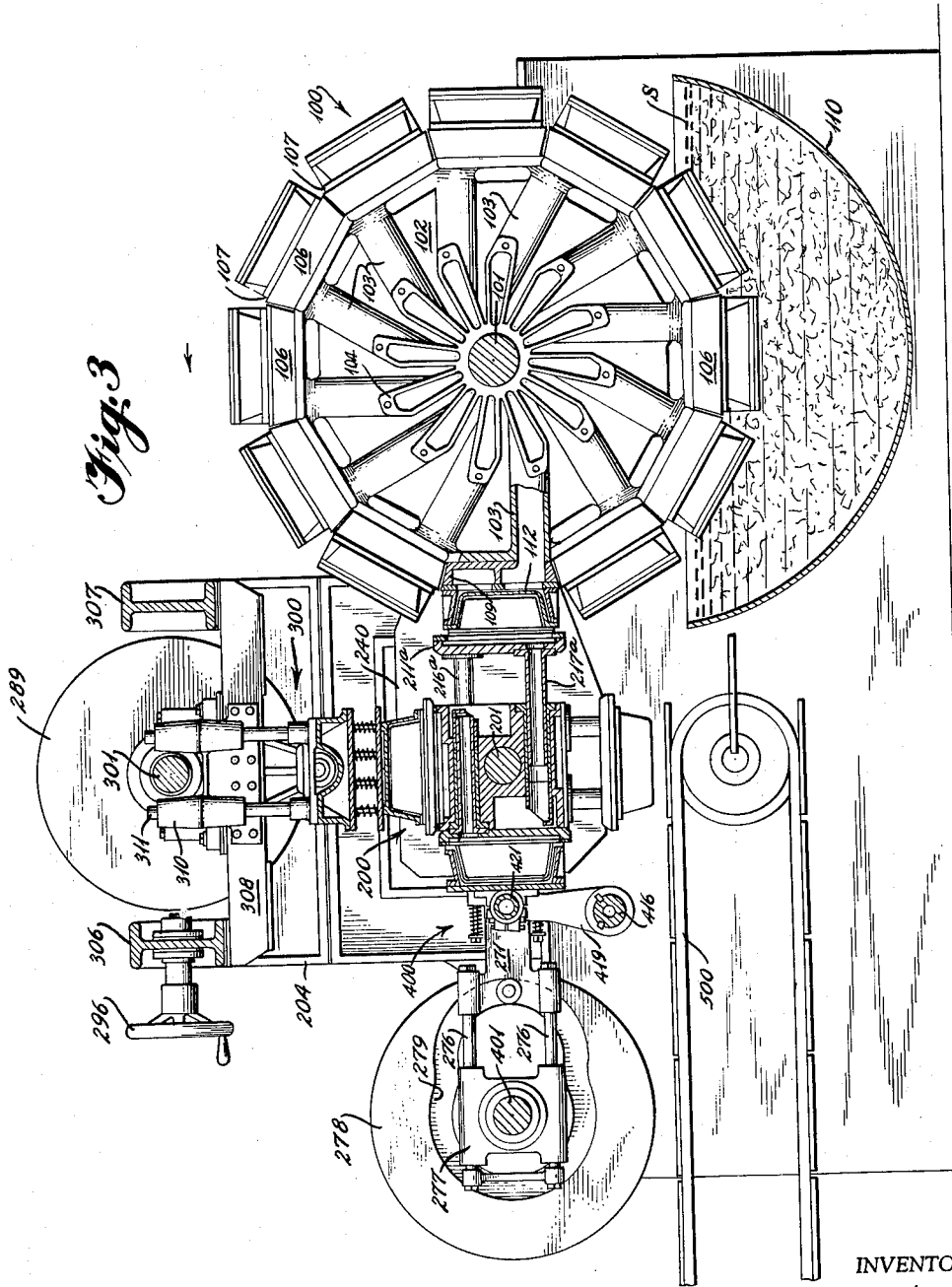
FIGURE 3 is a cross-sectional view taken on the line 3—3 of FIGURE 1.

Referring now to the drawings, wherein like reference numerals are used to designate like or corresponding parts throughout the several views, there may be seen in FIGURES 1, 2 and 3 a molding machine having the following major components:

A forming cylinder and slurry tank 100,
A turret 200,
A pressing mechanism 300,
A take-off mechanism 400.

The forming cylinder 100 functions in the usual manner to support forming dies and to immerse them into the slurry to mold an article thereon. The article is removed from a face of the forming cylinder 100 and is transferred to the turret 200. The turret 200 then revolves through 90°, and the articles that were received from the forming cylinder 100 are in position beneath the pressing mechanism 300. Pressing dies of the pressing mechanism 300 descend to effect a pressing action of the articles on the turret 200. Upon retraction (lifting) of the pressing dies of the pressing mechanism 300, the turret 200 revolves through another 90° where the articles may be removed by the take-off mechanism 400, and deposited onto the conveyor 500 therebelow (as shown in FIGURE 3) or alternatively the take-off mechanism 400 may immediately replace the articles on the dies on the turret 200, after which the turret 200 will revolve through another 90°, and the articles deposited directly onto the conveyor 500 from the turret 200.

*The forming cylinder*

The forming cylinder 100 comprises, as is best seen in FIGURE 3, a shaft 101 on which are mounted two spiders, spider 102 being shown to comprise a plurality of hollow spokes 103. Each spoke 103 has an opening 104 on the outer side thereof, the openings 104 of the spokes 103 all lying in a common plane. The two spiders 102 are shown in FIGURE 4 to be axially spaced on the shaft 101, and a platen 106 is secured to a spoke 103 of each of the spiders 102. The forming cylinder 100 is caused to revolve, in intermittent fashion, in a counter-clockwise direction as seen in FIGURES 2, 3 and 4, and in so doing the edge 107 of each of the platens 106 is presented first to the slurry S in the slurry tank 110, these edges 107 therefore being the leading edges of the platens 106. The opposite edge which is the trailing edge is designated 108.

Each of the platens 106 is secured to a spoke 103 of each of the spiders 102 in a particular manner, as shown best in FIGURE 4. In particular, the spoke 103 of the left-hand spider 102 is secured to the leading edge 107 and the spoke 103 of the right-hand spider 102 is secured adjacent the trailing edge 108. The platens 106 have upstanding sides 109 therearound, and thus there is provided a cavity with which the hollow of each of the spokes 103 communicates.

There are secured to the sides 109 suitable adapter plates 111 (see FIGURE 1) these adapter plates 111 carrying one or more forming dies 112. By way of illustration, the molding machine has been shown to be provided with three forming dies 112 on each of the twelve faces thereof.

As shown in FIGURE 1 there is provided on each side of the forming cylinder 100 a hood 115 within which is a valving arrangement for communicating the spokes 103 with either a source of pressure, through the lines 116, or a source of vacuum, through lines 117. The utilization and construction of the valving arrangements in conjunction with the spokes of a molding machine are well known, as is their communication at predetermined parts of their cycles with the pressure and vacuum sources.

The forming cylinder 100 is of relatively simple construction, having no internal moving parts. The platens are provided with large face areas communicating with the hollow spokes 103. There is no possibility of trapping water which could drain back onto the molded pulp article.

*The turret*

Referring now to FIGURE 5, there may be seen the turret generally designated 200, this turret 200 being keyed to a shaft 201 which extends therethrough and is supported at either end in the bearings 202 and 203. As is most clearly shown in FIGURES 6 and 7, the turret 200 is square in cross-section, and comprises a core 204. The core 204, which may be multiple casting has a plurality of passages 206, 207, 208 and 209 extending in a generally axial direction therethrough. There are also provided in the core 204 a plurality of tubular holes which respectively communicate with the several passages 206, 207, 208 and 209.

Each of the faces 210a, 210b, 210c, 210d of the turret 200 has a corresponding platen 211a, 211b, 211c, 211d associated therewith, each such platen carrying an adapter plate 212a, 212b, 212c, 212d, and secured to the various adapter plates 212 are dies 213. The dies 213 are of the same shape as the various forming dies 112, and have a plurality of holes 214 therethrough.

Each of the platens 211 has an upper tube 216 and a lower tube 217 secured to it and in fluid communication with it. Thus, as may be seen in FIGURE 6, the platen 211a has a lower tube 217a. In FIGURE 3, the platen 211a is in an extended position, and there are shown the upper tube 216a and lower tube 217a connected with it. Attention is also invited to the location, as seen in FIGURE 5, of tubes 216a and 217a on one hand and 216c and 217c on the other hand.

The various tubes 216 and 217 are slidable within the aforementioned holes in the core 204, and as may be seen in FIGURE 6, there is an upper hole 218c having a sleeve 220c therein, the sleeve 220c receiving the tube 216c in slidable relation thereto. Similarly, in the hole 219a is a sleeve 221a which slidingly receives the tube 217a.

The tubes 216 and 217 for each of the platens 211 communicates with one of the aforementioned passages 206, 207, 208 and 209. In particular, passage 207 is in communication with the tubes 216a and 217a and passage 206 is in communication with tubes 216c and 217c. The passages 206, 207, 208 and 209 extend axially through the turret from end to end thereof, and thus pass through the abutting walls 224 (see FIGURE 5) of the two parts of the multiple casting core 204. The continuity of these passages through the walls 224 is shown in FIGURE 7, wherein the passages 206, 207, 208 and 209 may be seen to pass through the walls 224.

At the right-hand end of the turret, as viewed in FIGURE 5, a housing 225 is shown and as is indicated in FIGURE 8, the housing 225 contains a first passage 226 that is connected with the passage 206 in the turret 200 and also contains a passage 227 which is connected with the passage 207. Otherwise stated, and referring to FIGURE 3, the passage 226 communicates with that passage in turret 200 which is closest to the forming cylinder 100 and which communicates with the platen 211 which is faced towards the take-off mechanism 400. Conversely, the passage 227 communicates with the passage in turret 200 which is closest to the takeoff mechanism 400 and which communicates with the platen that is closest to the forming cylinder 100. Passage 226 is connected with a conduit 232 which may be connected with sources of pressure and vacuum in a predetermined sequence. Passage 227 is connected with a conduit 233 which is connected with a source of suction.

At the other end of the turret 200 as viewed in FIGURE 5, i.e., the left end, there are provided (see FIGURE 9) two passages 228 and 229 in a housing 230, the passage 228 communicating with the passage 208 and the passage 229 communicating with the passage 209 when the turret is in the position shown in FIGURE 6. The passages 228 and 229 may be seen to extend within the housing 230 through substantially more than 90° each, this being in contrast to the extent of passages 226 and 227 shown in FIGURE 8. The passage 229, which is connected through passage 209 with the platen on the upper face of turret 200, is connected by the conduit 234 shown in FIGURE 1 with a source of vacuum, and the passage 228, which is connected through the passage 208 with the platen on the lower face of the turret 200, is connected with a source of pressure by means of the conduit 235, also shown in FIGURE 1.

As may be seen from FIGURE 6, the platen 211a may be extended to the right, away from the face 210a of the turret 200, the purpose of this extension being to nest the dies 213 (see FIGURE 3) in the forming dies 112 of the forming cylinder 100, to effect a transfer of a wet molded pulp article from the forming dies 112 onto the dies on the turret 200. Also, as may be seen in FIGURE 6, the platen 212d may be extended downwardly, this for the purpose of depositing molded pulp articles onto a conveyor for transport through drying ovens.

To effect movement of the platen, and referring first to FIGURE 5, there are provided at either end of the turret 200 two substantially identical side plates 240 and 241. Each of the plates 240, 241 (see plate 240 in FIGURE 9) is provided with a circular groove 242 on the internal face thereof, i.e., the face which is closest to turret 200. Side plate 240 has a slot 243 therein which extends horizontally from within circular groove 242 outwardly thereof, and towards forming cylinder 100.

At the upper end lower margins of slot 243 on the outer side of the side plate 240, as is best seen in FIGURE 10, there are provided an upper retaining plate 244 and a lower retaining plate 245. On the inner side of side plate 240, adjacent the upper and lower margins of the slot 243, there are provided an upper rail 246 and a lower rail 247.

A crosshead 250 is slidable in the slot 243 of side plate 240, and has on the inner face thereof an arcuate groove 251 that registers with the groove 242 and completes the circular extent thereof when the crosshead 250 is in the retracted position, which is that shown in full lines in FIGURE 9. The crosshead 250 may be moved, by mechanism to be described hereinbelow, to the dotted line position shown in FIGURE 9.

As shown in FIGURE 10, the platen 211a has a pair of arms 253 and 254 extending outwardly thereof. The arms 253 and 254 extend parallel to the turret shaft 201 (which is not shown in FIGURE 10) and each of the arms 253 and 254 carries an inner roller and an outer roller, arm 253 carrying the inner roller 255 and outer roller 257 and the arm 254 carrying the inner roller 256 and the outer roller 258. The outer rollers 257 and 258 ride in the groove 242 and the groove 251, it being understood that each of the four platens is provided with two arms 253 and 254 at each end thereof and that the eight arms 253 and 254 at each end of the turret 200 ride in the grooves 242, 251, of the side plates 240 and 241. Thus, the eight shafts 253a, 254a, 253b, 254b, etc. are shown in FIGURE 9.

When the crosshead 250 is caused to move to the dotted line position shown in FIGURE 9, the inner rollers 255 and 256 will ride on the rails 246 and 247, as is clearly shown in FIGURE 10. Hence, movement of crosshead 250 will cause the sides of arcuate groove 251 to act on the outer rollers 257 and 258 to move them to the left as shown in FIGURE 9 and the inner rollers 255 and 256 will immediately engage with the rails 246 and 247 to permit movement of the rollers 255 and 256, and consequently arms 253 and 254 and platen 211a, only in a horizontal direction. There will thereby be effected the movement of the platen 211a away from turret 200 and to the position shown in FIGURES 3 and 6.

To effect a downward movement of the platen 211d, there is provided in side plate 240 a groove 259 which has margins which extend parallel to a vertically downwardly directed radius of the circle of groove 242, the inner end of slot 259 lying within the groove 242. A crosshead 260 is provided, having an arcuate groove 261 therein which is in registry with and concentric to the groove 242 when crosshead 260 is in the retracted position shown in FIGURE 9. As may be seen from FIGURE 11, platen 211d has arms 253d and 254d extending therefrom carrying inner and outer rollers as described above in connection with FIGURE 10. Retaining plates 264 and 265 are provided for the crosshead 260 and rails 266 and 267 are provided for the inner rollers 255d and 256d.

Movement of crosshead 260 in a downward direction, to the dotted line position shown in FIGURE 9, will effect a downward movement of platen 211d away from turret 200, as is illustrated in FIGURES 3 and 6.

To effect translation of crosshead 250, a pair of horizontal pusher rods 270 (see FIGURES 10 and 12) are connected to it, on the outer side of side plate 240. These pusher rods 270 are carried in a pusher plate 271, the pusher rods 270 extending through bores in the plate 271 and each having a spring 272 encircling the ends thereof remote from the crosshead 250, these springs 272 being held between enlarged heads 273 of the pusher rods 270, respectively, and between a shoulder on the pusher plate 271. There are also provided, as may be seen in FIGURE 2, a pair of springs 274 between shoulders 275 on the pusher rods 270.

Referring again to FIGURE 12, the pusher plate 271 has a pair of rearwardly extending guide rods 276, these guide rods passing through a guide member 277 on shaft 401. Adjacent guide member 277 and secured to a shaft 401 is a cam plate 278, having a cam groove 279 in one face thereof.

Since there are two crossheads 250, one in each of the plates 240 and 241, there are provided two identical drives for these two crossheads, and there may be seen in FIGURE 1 the two cam plates 278, one near either end of the shaft 401.

To cause movement of the crosshead 260, there is provided a pusher pin 281 (see FIGURE 11) which connects the crosshead 260 with a plate 282. Plate 282 has secured to it pusher rods 283, these pusher rods 283 being driven by a pusher plate 284. As shown in FIGURE 12, the pusher plate 284 acts through abutments 285 to drive the pusher rods 283 downwardly, and acts on springs 286 to move the pusher rods 283 upwardly. Guide rods 287 extend upwardly from the pusher plate 284, and through appropriate bores in a guide member 288 that is on a shaft 301. Also on shaft 301 is a cam plate 289 having a groove 290 therein. As may be seen from FIGURE 5, the pusher plate 284 has a cam follower 291 that rides in the groove 290 of cam plate 289.

The functioning of the drive mechanism described immediately above for the crosshead 260 is substantially the same as that for the crosshead 250.

The drive for cam plate 289 is effected through a drive plate 292 which is secured to cam plate 289 by a pair of removable pins 293. As may be seen from FIGURE 5, drive plate 292 is keyed to the shaft 301. The pins 293 are removable because sometimes it is desirable to render inoperative the drive for crosshead 260, and in such instances the pins 293 are removed and a detent 294 (see FIGURE 14) may be caused to move into a bore 295 in the cam plate 289 by a suitable hand wheel 296. The detent 294 is mounted in the I beam 306, and it will be observed from the dotted lines showing of cam groove 290 that the pusher plate 284 will be held in its uppermost position, and so the crosshead 260 will be in its retracted position.

The turret drive is positive in operation, and is conveniently external to the turret. The springs and loss motion provided thereby prevent machine damage in the event two articles are encountered on the same die.

*The pressing mechanism*

The pressing mechanism cooperates with the turret to press the molded pulp articles between pressing dies carried by the pressing mechanism 300 and the dies on the turret 200.

Referring now to FIGURE 5, there may be seen a shaft 301 which is supported on bearings 302 and 303, these bearings resting upon support structure such as the girders 304 and 305. The shaft 301 is continuously driven in timed relationship to the other shafts, in particular, shaft 101 of the forming cylinder and shaft 201 of the turret. Extending between the girders 304 and 305, and in generally parallel relationship to shaft 301, are a pair of I-beams 306 and 307, as may be seen from FIGURE 14. The I-beams 306 and 307 carry an intermediate beam 308, which in the embodiment illustrated is made of several channels and plates. The beam 308 supports a bearing 309 for the shaft 301, and thereby it may be seen that shaft 301 is supported in bearings at its two ends and at its middle. The beam 308 also serves to support the guide sleeves 310a, 310b, 310c, and 310d, all four of which may be seen in FIGURE 1. Within each of the guide sleeves 310 there is a guide rod 311, these rods being adapted to slide within the sleeves 310.

The rods 311 are secured to and support a housing 312 having a cavity therewithin. Clamps 313 secure a plate 314 to the housing 312, the plate 314 having a plurality of holes therethrough. Rods 316 having nuts 317 on their upper ends within the housing 312 extend through the holes in the plates 314, and are secured to a platen 318. Springs 319 encircling the rods 316 urge the platen 318 away from the plate 314. Secured to the platen 318 are a plurality of pressing dies 320.

Referring now to FIGURES 5 and 13, there may be seen keyed to the shaft 301 outwardly of the sleeves 310 a pair of eccentrics 325 and 326. Eccentric 325 comprises a circular plate 327 having a grooved rim 328. An eccentric strap made up of the two parts 331 and 332 are secured together as by the bolts 333 and 334 (see FIGURE 13). The lower half of strap 332 has a downward extension 335 which carries at its lower end a hub 336. A shaft 337 extends through the hub 336 of lower strap 332, and also extends through a pair of bearings 338, 339 which are supported by the housing 312.

In operation, rotation of the shaft 301 will cause the eccentric discs of the eccentrics 325 and 326 to rotate, and these discs will cause the straps associated therewith to rise and fall, the straps carrying with them the housing 312 and the pressing dies 320. Because of the constraint imposed upon the guide rods 311 by the guide sleeves 310, which latter are fixed to the beam 308, the motion of housing 312 will be straight-line vertical motion.

The pressing dies 320 will, because of the motion above described, be caused to descend in straight line motion and to press molded pulp articles on the upwardly facing dies 213 on the turret 200, and will thereby cause these articles to be pressed. The springs 319 will accommodate some irregularity in the thickness of the articles and will also prevent damage to the machine should two articles inadvertently be on a turret platen die.

*The take-off mechanism*

The take-off mechanism comprises a platen that acts in conjunction with those dies on the opposite face of the turret 200 from the forming cylinder 100, as may be best seen in FIGURE 3. In one operation the dies of the take-off mechanism simply remove the molded pulp articles from the dies on the turret 200 and then immediately replace these molded pulp articles onto the same dies of the turret 200 from which they were removed. In another operation, the articles are removed by the dies of the take-off platen and are placed upon conveyor 500 therebelow.

Referring now to FIGURES 3 and 15–21, there may be seen a shaft 401 that is journaled in bearings 402 and 403. This shaft is driven in synchronism with the aforementioned turret shaft 201 and forming cylinder shaft 101. As is seen in FIGURES 15 and 16, the shaft 401 has a plate cam 404 secured thereto outwardly of the bearing 402. Plate cam 404 has a cam groove 405 (see also FIGURE 18) in one face thereof. A slide guide 406 is secured to the supporting framework adjacent the plate cam 404.

The slide guide 406 has a slideway formed by a groove therein and a pair of retaining plates 407 (see FIGURE 17) which serve to retain a slide 408 in the slideway.

Slide 408 has extended therefrom a cam follower 409 which rides in the groove 405 of the plate cam 404. A connecting link 410, comprising the two socket ends 411 and 411' and a rod 412 threaded at both its ends into the sockets of the ends 411 and 411', is pivotally connected to the slide 408 by the pin 413.

The socket end 411' is pivotally connected, by a pin 414 to a lever 415 that is keyed to actuator shaft 416.

Actuator shaft 416 is carried by the bearings 417 and 418, as shown in FIGURE 15, and has keyed thereto the two arms 419 and 420. The arms 419 and 420 carry at their upper ends a support shaft 421. Secured to shaft 421, by the collars 422, 423 and 424, is a platen 425 which may be seen in FIGURE 20 to carry an adapter plate 426 and die 427. As is apparent from FIGURE 1, there are three such dies 427 carried by the platen 425. FIGURE 20 further illustrates the manner in which the die 427 engages with the molded pulp article A, carried by die 213c of the turret 200.

As may be seen in FIGURE 21, actuator shaft 416 has a passage partially axially therethrough, and the arm 419 is hollow and in fluid communication with the passage in shaft 416. Support shaft 421 is hollow through approximately one-half its length and the collar 423 is provided with an annular space which communicates with the passage 431 (see FIGURE 20) and thereby with the interior of shaft 421. The fluid communication passage thus provided permits the aforementioned vacuum and pressure to be communicated to the die 427, which is perforated as shown.

In operation, rotation of shaft 401 will cause the slide 408 to oscillate back and forth in the slide guide 406, under the urging of cam follower 409. Because of the connection through link 410 of the slide 408 with the lever 415, the latter will be caused to oscillate about the axis of actuator shaft 416, and the actuator shaft 416 will in turn be caused to oscillate about its own axis. As actuator shaft 416 oscillates, it will impart this motion to the arms 419 and 420, and thus these arms will be moved between the full line position and the dotted line position shown in FIGURE 16. As a consequence, support shaft 421 will be carried in a back and forth manner, and will thereby position platen 425 and dies 427 either in the contacting position shown in FIGURES 16 and 20 or in a withdrawn position, indicated by the dotted lines thereof.

The purpose of removing the molded pulp articles A from the turret dies 213 and then replacing these articles A onto the same dies from which they were removed is to free the articles A from the turret dies so that they may be easily discharged therefrom at the next step of the turret without danger that any molded pulp article will fail to discharge from a turret die.

As will be understood, removal of a molded pulp article from a turret die will be accomplished with the aid of blowing through the dies 213 of the turret 200 and sucking through the dies 427 and the above described communicating passages, the reverse blowing and sucking operations taking place when the article A is returned to the dies 213 of the turret 200.

In some instances, it may be desirable to remove articles from the vertical face of turret 200 opposite the forming cylinder 100 and to deposit these articles directly onto a conveyor therebeneath. To accomplish this, there is provided mechanism shown in FIGURES 22 through 28, which is shown at the right-hand side of FIGURE 15.

Referring first to FIGURE 15, there may be seen at the right-hand extremity of shaft 401 a pair of plates 451 and 452. Plate 451 (see FIGURE 23) is keyed to the shaft 401 and has a radially extending slot 453 therein. A slide member 454 is positioned in the slot 453, and has a hole therethrough. The plate 452 has a plurality of holes 456 and 457 therein, which are at different radii and at different distances from the center of rotation of shaft 401 and plates 451 and 452. The driving plate 451 and the driven plate 452 are secured together by the four screws 458, and as will be understood, either of the holes 456 or 457 may be placed in registry with the slot 453 and the slide member 454 therein. A connecting rod pin 459 extends through the driven plate 452 and the hole in slide member 454, and is secured by a suitable nut 461. This connecting rod pin 459 serves to connect the connecting rod 460 to the plates 451 and 452. Thus, these plates 451 and 452 act as a crank plate for the connecting rod 460, and depending upon whether the plates 451 and 452 are assembled with hole 456 or hole 457 in alignment with radial slot 453 and slide member 454, the effective "throw" of the crank plate assembly will be thereby determined. The slide member 454 can, of course, be positioned in a radial manner in the slot 453 so that it is in registration with either of the holes 456 or 457, as desired.

Connecting rod 460 is made of several parts, which are screw threaded together and which may be disassembled, thereby permitting the connecting rod 460 to be disassembled from the crank plates 451, 452. At its lower end, as viewed in FIGURE 22, the connecting rod 460 is pivotally secured to a lever 462 that is keyed to the actuator shaft 416.

Figure 24:
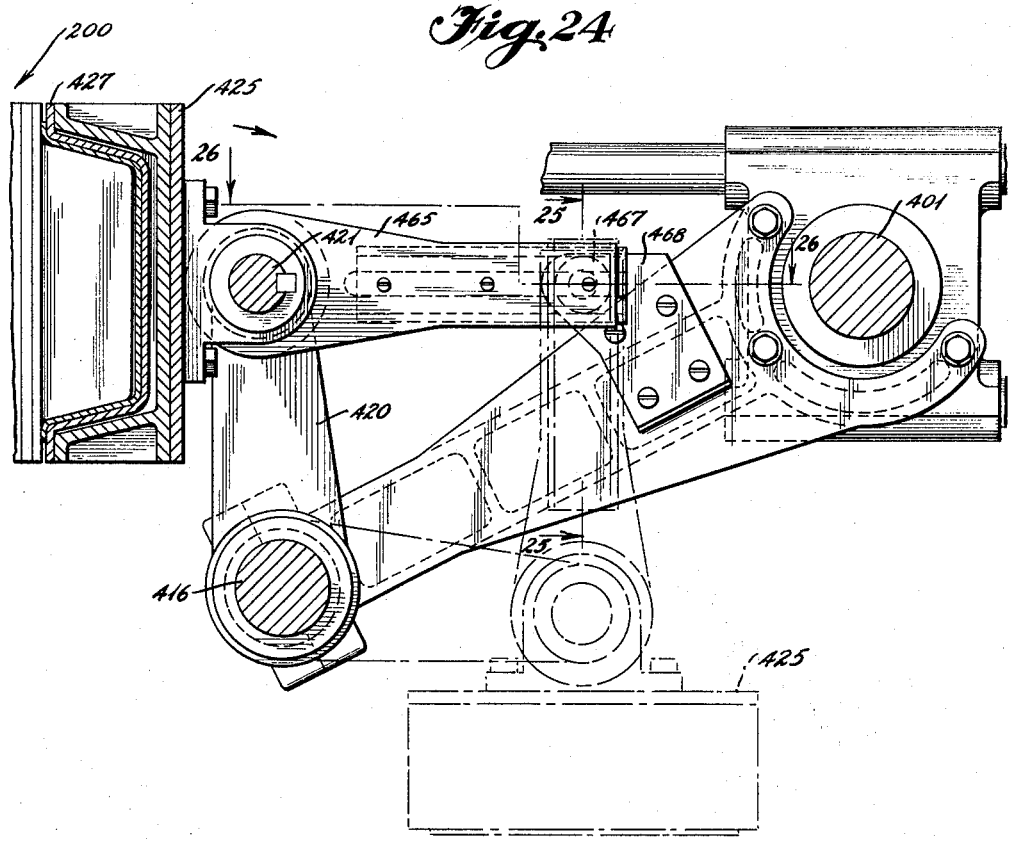
FIGURE 24 is a cross-sectional view taken on the line 24—24 of FIGURE 15.
Figure 25:
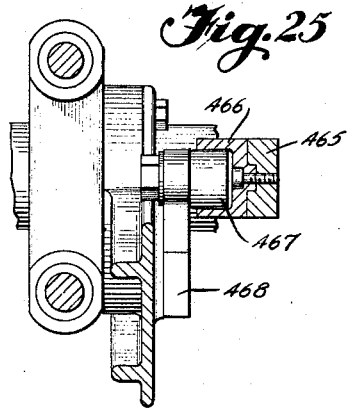
FIGURE 25 is a cross-sectional view taken on the line 25—25 of FIGURE 24.
Figure 26:
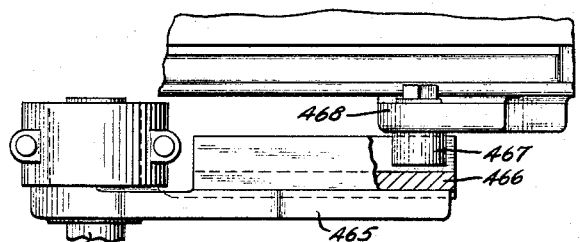
FIGURE 26 is a cross-sectional view taken on the line 26—26 of FIGURE 24.

Referring now to FIGURE 24, it may be seen that the actuator shaft 416 carries the arm 420 which in turn carries support shaft 421; and that there is secured to support shaft 421 a guide arm 465. Guide arm 465 has secured to it, as is shown in FIGURE 26, a slide guide 466 which receives in the groove thereof a roller 467 supported by the plate 468. This construction is also shown in FIGURE 25.

In operation, and assuming that the connecting link 410 has been removed and that the connecting rod 460 is in place, rotation of shaft 401 will cause the lever 462 to oscillate, thereby oscillating actuator shaft 416 and the arms 419 and 420. As the arms 419 and 420 rotate in a clockwise direction as shown in FIGURES 24, 27 and 28, platen 425 and dies 427 will be withdrawn from the turret 200 and guide arm 465 will move rearwardly, slide guide 466 sliding on roller 467. As the shaft 416 continues to rotate, shaft 421 will move in an arc about the axis of shaft 416, thereby subjecting guide arm 465 to a translating and rotating motion, since it is constrained by the roller 467. Further rotation of shaft 416 will then cause the guide arm 465 to rotate on roller 467, as the arms 419 and 420 continue their rotation. Finally, the shaft 421 will be in the position shown in FIGURE 28, where it is to the right of shaft 416, having rotated from a position substantially above the shaft 416. As may be seen from FIGURE 28, the guide arm 465 will be substantially vertical with the platen 425 at the lower end thereof. By then causing a blowing action into the platen 425, molded pulp articles in the dies 427 may be discharged onto a conveyor therebelow, it being noted that the molded pulp article A is shown in FIGURE 28 to be in the inverted position.

In some installations it may be desirable to provide for both the take-off and replacement of some of the molded pulp articles from the third face of the turret 200 on the one hand, and for the removal of the remainder of the molded pulp articles and their deposition directly onto the conveyor, on the other hand. Thus, there would be simultaneously accomplished the functions of the mechanisms shown in FIGURES 16 to 20 and the mechanism shown in FIGURES 22 to 28. To this end there is provided the construction shown in FIGURES 29, 30 and 31.

Referring now to FIGURE 29, there may be seen an inner actuator shaft 476 having telescoped over the lefthand part thereof an outer actuator shaft 477. Actuator shaft 477 is caused to oscillate by mechanism substantially identical to the mechanism shown at the left-hand side of FIGURE 15 and in FIGURES 16 to 20. Thus, there may be seen at the left-hand side of FIGURE 29 a plate cam 404 and a lever 415 oscillatably driven thereby, lever 415 being connected to the outer actuator shaft 477. A hollow arm 478 is secured to the outer actuator shaft 477, as well as a solid arm 479, and these two arms together carry a support shaft 480. Support shaft 480 supports, through the collars 481 and 482, the platen 483. As may be seen in FIGURE 30, a hollow arm 484 is also positioned on outer shaft 477, the hollow thereof connecting with the passage in arm 478. Support shaft 480 communicates with the hollow in arm 478, and through this series of passages the dies carried by platen 483 may be connected with suction and pressure.

Turning now to the right-hand side of FIGURE 29, and to FIGURE 31, inner actuator shaft 476 is caused to oscillate through substantially 90° by the crank plates 451 and 452 operating from the shaft 401, and the connecting rod 460. These parts are substantially the same as those shown in FIGURES 23 and 24. There are also provided the guide arm 465, and roller 467, which are shown in FIGURES 23 through 26. Arms 485 and 486 are secured to inner actuator shaft 476, and carry a support shaft 487. A platen 488 is supported on support shaft 487 by collars 489 and 490. The platen 488 will have the same motion as the platen 425 shown in FIGURES 27 and 28. Thus, the platen 488 will take molded pulp articles from the turret 200 and deposit them onto a conveyor in the inverted position as shown in FIGURE 28.

To supply suction and pressure to the dies carried by platen 488, the shaft 476 is provided with a bore 491 (see FIGURE 31) which communicates through a passage 492 with the passage 493 in arm 486. Passage 493 is in communication with a passage 494 in the support shaft 487.

Drive

Power will be supplied to the machine from the motor 150 (see FIGURE 1) to intermittent gear drive 151 to cause shaft 101 and forming cylinder 100 to rotate intermittently, making one-twelfth of a revolution per step and then stopping. Similarly, motor 150 will also drive the intermittent gear mechanism 152 to intermittently rotate turret shaft 201, through one-fourth of a revolution at each step, and will also rotate shaft 401 in a continuous manner, and in synchronization with the other shafts. Also, motor 150 will continuously rotate shaft 301 in synchronization with the other shafts.

Recapitulation of operation

The forming cylinder 100 being caused to rotate in a step-by-step manner in a counterclockwise direction as viewed in FIGURES 2 and 3, will form a wet molded pulp article on the dies 112 thereof, and after the particular die under consideration has been intermittently rotated through substantially three-fourths of a revolution, will come to a halt opposite the turret 200. As shown in FIGURE 3, the platen 211a will extend so as to nest the dies carried thereby against the molded pulp article carried by the forming dies 112 on forming cylinder 100. At this time there will occur a blowing through the hollow spokes 103 of forming cylinder 100 and a simultaneous sucking through the tubes 216a and 217a that are connected with the platen 211a. The molded pulp articles will then be transferred, by this combined sucking and blowing action, to the dies 213a carried by the platen 211a; thereafter, the platen 211a will be retracted so as to lie against a face of the turret core 204.

Turret 200 will then rotate in a counterclockwise direction so as to bring the dies under consideration into position beneath the pressing die 320 of the pressing mechanism 300. The pressing dies 320 will be caused to descend by the mechanism comprising the eccentrics on shaft 301 and there will be a pressing of the molded pulp articles between the pressing dies 320 and the dies 213 on the turret 200. Upon the retraction of pressing dies 320, the turret 200 will be caused to rotate through another 90° counterclockwise step, thus bringing the dies under consideration into position opposite the take-off dies 427.

In certain operations, the take-off dies 427 will have the molded pulp articles transferred to them from the dies 213 of turret 200, by the aforementioned combined blowing and suction actions, to thereby deposit the articles onto a conveyor from the third face of the turret 200. In such instances, the molded pulp articles will be in a generally inverted position where the dies are shaped as shown in the present illustrated embodiment to form and press shallow containers.

On the other hand, it may be desirable to merely loosen the molded pulp articles and so the dies 427 of the takeoff mechanism will merely remove the articles from the dies 213 of the turret 200 and immediately replace them thereon (see FIGURES 16 to 23). The molded pulp articles now having been replaced onto the third face of the turret 200, will be carried by the turret 200 during its next rotation to the fourth or downwardly facing face, at which time the plate will be extended and the molded pulp articles deposited onto the conveyor 500 in an upright position, as distinguished from the inverted position mentioned hereinabove.

There has been provided a molding machine capable of forming, pressing and delivering at a high rate of production a wide range of sizes of articles. The machine will not be damaged should any die have two articles thereon. Articles may be delivered from the machine either in an upward or a downward position.

It will be obvious to those skilled in the art that various changes may be made without departing from the spirit of the invention and therefore the invention is not limited to what is shown in the drawings and described in the specification but only as indicated in the appended claims.

What is claimed is:

1. For use in a machine for producing molded pulp articles by deposition on a forming cylinder, a turret, means rotatably supporting said turret for rotation about an axis of rotation, said turret having a plurality of faces, a die on each said face, means for extending each said die radially of said turret when disposed in a predetermined oriented position for effecting transfer of articles onto said turret, means for maintaining fluid connection between the interior of said turret and said dies in all positions thereof, a pressing die, means mounting said pressing die for movement towards and from said turret for pressing of articles between said pressing die and the dies of said turret, a conveyor below said turret, an auxiliary die, means mounting said auxiliary die for movement towards and from said turret for removal of articles from said turret die and for repositioning of said articles on said turret die or for deposition of said articles on said conveyor, said auxiliary die mounting means comprising a support shaft having said auxiliary die thereon, an oscillatable actuator shaft having an arm connected thereto, said support shaft being journalled in said arm, a guide arm fixed to said support shaft and having a groove therein, and a fixedly mounted guide in said grooves.

2. A turret for a pulp molding machine comprising a core extending longitudinally therethrough for receiving a shaft, four faces arranged rectangularly about said core, said turret including portions communicating through each face of the turret, said turret including a chamber extending longitudinally of said turret adjacent each face thereof, said turret portion of one face communicating with the chamber at an opposite face, first passage means connecting one pair of oppositely disposed chambers with one end of said turret, second passage means connecting the other pair of oppositely disposed chambers with the other end of said turret, and conduit means fluid connected with said passage means, whereby air and vacuum may be directed to the turret portions communicating with each turret face.

3. A turret for a pulp molding machine comprising a core means, said turret including a plurality of longitudinally extending faces defined by said core means, said turret including a longitudinally extending passage in said core means for each face thereof, said turret including portions forming openings extending transversely through each face of said turret and communicating with a corresponding said longitudinally extending passage.

4. The turret of claim 3, said turret including at each said face a platen associated therewith, said turret including tube means extending from each said platen and in said openings to thereby communicate each said platen with a corresponding longitudinally extending passage, and means on said turret for extending said platen from said core means.

5. In a pulp molding machine, a turret shaft having a turret thereon, said turret having rectangularly arranged faces about said shaft, a platen associated with each face of said turret, a side plate at each end of said turret, each said side plate having a groove therein concentric to the axis of the turret shaft, each said platen having a pair of arms at each end thereof extending outwardly parallel to the turret shaft, said arms each carrying an inner roller and an outer roller, the outer rollers engaging in said grooves, said side plate having a slot therein defined by a pair of spaced opposed margins extending parallel to a radius of said turret shaft, a cross-head in said slot and in sliding engagement with said margins, said cross-head being slidable towards and away from said turret and having a groove therein that is a continuation of said concentric groove in said side plate when said cross-head is in an inner position that is relatively close to the turret shaft, and means for reciprocating said cross-head.

6. In a pulp molding machine, a turret shaft having a turret thereon, said turret having a plurality of faces, a platen associated with each said face, plate means in juxtaposition with said turret perpendicular to the shaft thereof, said plate means having a continuous groove therein extending about the axis of the turret shaft, said plate means including a slot extending radially of said turret axis, a cross-head slidable in said slot, said cross-head having a part of said continuous groove extending therein, each said platen having means engaging in said continuous groove, and means for reciprocating said cross-head to extend a platen from said turret.

7. In a pulp molding machine in accordance with claim 6, said turret including a plurality of passages, and means for providing communication between each said platen and one of said passages in all positions of said platens.

8. In a pulp molding machine in accordance with claim 7, said plate means slot extending horizontally, and means on said plate means and said platen for restraining said platen to horizontal motion during reciprocation of said cross-head.

9. In a pulp molding machine in accordance with claim 8, said last mentioned means comprising roller means journalled on each said platen, and horizontal rail means extending on said plate means adjacent said slot.

10. Article take-off mechanism in combination with a turret of a pulp molding machine, said article take-off mechanism comprising an oscillatable actuator shaft, at least one arm connected to said actuator shaft, a support shaft journalled in said arm, a connecting link fixed to said support shaft, said connecting link having a longitudinally extending groove therein, a fixedly mounted bearing in said groove, and a die fixed to said support shaft, whereby as said actuator shaft oscillates said support shaft will oscillate therewith and will rotate about its own axis.

11. The apparatus of claim 10, a drive shaft having crank plate means thereon, a lever on said actuator shaft, and a connecting rod pivotally connected to said lever and said crank plate means.

12. The apparatus of claim 11 further comprising means for varying the throw of said crank plate means.

13. The apparatus of claim 11, said means for varying the throw of said crank plate means comprising a driving plate secured to said drive shaft, said driving plate having a radially extending slot therein, a slide member mounted for slidable movement in said slot, said slide member having a hole therethrough, a driven plate adjacent said driving plate and having a plurality of holes therethrough at different radii and at different distances from the center of rotation thereof, a connecting rod pin for insertion through a hole in said driven plate and the hole in said slide member, and means for oscillating said shaft through approximately 30°, said last mentioned means comprising a drive shaft having a plate cam thereon, a slide guide adjacent said plate cam, a slide carried in said slide guide and slidable therein, a follower secured to said slide and engaged with said cam, a lever connected to said actuator shaft, and a connecting link pivotally connected to said lever and said slide.

14. For use in a machine for producing molded pulp articles by deposition on a forming cylinder, a turret, means rotatably supporting said turret for rotation about an axis of rotation, said turret having a plurality of faces, a die on each said face, means on said turret extendibly supporting each said die for radial movement with respect to said turret axis of rotation when said turret is disposed in a predetermined oriented position for effecting transfer of articles onto said turret, means on said turret maintaining fluid connection between the interior of said turret and said dies for all positions of rotation thereof, a pressing mechanism including a pressing die, said pressing mechanism including means displaceably mounting said pressing die for movement toward and away from said turret during another oriented position thereof and pressing an article between said pressing die and the dies of said turret, conveyor means disposed below said turret for receiving an article therefrom, and an article take-off mechanism above said conveyor means and including an auxiliary die, said take-off mechanism including means displaceably mounting said auxiliary die for movements toward and away from said turret dies, said take-off mechanism including means for momentarily removing articles from said turret dies and redepositing the same articles onto the turret die from which it was removed.

15. The structure of claim 14 in which said turret includes means radially extending each of said turret dies from said turret axis of rotation downwardly onto said conveyor means for effecting transfer of articles thereon.

16. The structure as set forth in claim 14 in which said turret includes a platen on each said face, each platen having one of said dies mounted thereon, said means extendably mounting each said die comprising rollers carried by said platen, guide means in concentric relation with respect to the axis of rotation of said turret for receiving said rollers therein, said guide means having a radially displaceable portion, and means engageable with said radially displaceable portion for moving the same.

17. The structure as set forth in claim 14 in which said means displaceably mounting said pressing die comprises a shaft parallel to axis of rotation of said turret and having a disc eccentrically mounted thereon, a strap circumposed about the periphery of said disc, said disc being rotatable in said strap, and a platen pivotally connected to said strap and having said pressing die mounted thereon.

18. The structure as set forth in claim 17 including means engaged with said platen and maintaining said platen in a rectilinear path of travel between axis of rotation of said turret and the longitudinal axis said shaft.

19. A machine as in claim 18, said last mentioned means comprising a fixed guide sleeve, and a guide rod in said guide sleeve, said guide rod being secured to said platen.

20. In a machine for producing molded articles, a rotatable turret including plurality of dies disposed thereon, means on said turret for receiving and removing articles on said dies, a pressing mechanism including extendable die means for pressing articles disposed on said turret dies, conveyor means below said turret for receiving a pressed article from said turret dies, and article take-off mechanism adjacent said turret and above said conveying means, said article take-off mechanism including displaceably-supported, article-engaging die means, said article-engaging die means including means for momentarily removing a pressed article from said turret dies and redepositing the same articles back onto said turret dies from which they were removed for facilitating subsequent deposit of the pressed articles onto said conveyor means below said turret.

21. A structure of claim 20 in which said article take-off mechanism includes means for removing an article from said turret dies and depositing it onto said conveyor means.

22. A structure of claim 21 in which said turret includes extendable support means displaceably supporting said turret dies, operating means disposed in spaced relation from said turret dies and engageable with said extendable support means for disposing said turret dies in a position to receive a molded article for subsequent engagement by said extendable die means of said pressing mechanism.

23. The structure of claim 22 including second operating means disposed in space relation from said conveyor means and engageable with said extendable support means for disposing said turret dies in a position to discharge molded articles onto said conveyor means.

24. The structure of claim 23 in which second operating means includes means retaining second operating means from extending said extendable support means and permitting said article to be deposited onto said conveyor means by said article take-off mechanism.

References Cited in the file of this patent

UNITED STATES PATENTS

| | | |
|---|---|---|
| 1,151,843 | Willard | Aug. 31, 1915 |
| 2,163,585 | Chaplin | June 27, 1939 |
| 2,494,743 | Chaplin | Jan. 17, 1950 |
| 2,576,765 | Patterson | Nov. 27, 1951 |
| 2,752,830 | Randall | July 3, 1956 |
| 2,772,608 | Emery | Dec. 4, 1956 |
| 2,856,793 | Budlong | Oct. 21, 1958 |
| 2,857,842 | Fair | Oct. 28, 1958 |
| 2,868,039 | Lee | Jan. 13, 1959 |
| 2,879,696 | Cox | Mar. 31, 1959 |